United States Patent
Toley et al.

(10) Patent No.: US 11,593,480 B2
(45) Date of Patent: *Feb. 28, 2023

(54) PREDICTIVE SCHEDULED ANTI-VIRUS SCANNING

(71) Applicant: EMC IP HOLDING COMPANY LLC, Hopkinton, MA (US)

(72) Inventors: Abhijit Toley, Pune (IN); Sachin Bochare, Pune (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 602 days.

This patent is subject to a terminal disclaimer.

(21) Appl. No.: 16/043,261

(22) Filed: Jul. 24, 2018

(65) Prior Publication Data

US 2020/0034534 A1 Jan. 30, 2020

(51) Int. Cl.
*G06F 21/56* (2013.01)
*G06N 5/00* (2023.01)
(Continued)

(52) U.S. Cl.
CPC .............. *G06F 21/56* (2013.01); *G06F 16/13* (2019.01); *G06F 16/182* (2019.01); *G06N 5/003* (2013.01); *G06N 20/00* (2019.01)

(58) Field of Classification Search
CPC ...... G06F 21/56; G06F 21/562; G06F 21/566; G06F 21/51; G06F 21/568; G06F 21/561;
(Continued)

(56) References Cited

U.S. PATENT DOCUMENTS

| 6,968,461 B1 * | 11/2005 | Lucas | G06F 21/564 |
| | | | 714/38.14 |
| 7,818,807 B1 * | 10/2010 | McCorkendale | G06F 21/562 |
| | | | 713/188 |

(Continued)

FOREIGN PATENT DOCUMENTS

RU 2491611 C2 * 8/2013

OTHER PUBLICATIONS

D. Pao, X. Wang, X. Wang, C. Cao and Y. Zhu, "String Searching Engine for Virus Scanning," in IEEE Transactions on Computers, vol. 60, No. 11, pp. 1596-1609, Nov. 2011, doi: 10.1109/TC.2010.250. (Year: 2011).*

*Primary Examiner* — Khalid M Almaghayreh
(74) *Attorney, Agent, or Firm* — Krishnendu Gupta; Deepika Bhayana; Derek Lam

(57) ABSTRACT

Implementations are provided herein for systems, methods, and a non-transitory computer product configured to use predictive analysis of quantifiable parameters associated with individual files stored on a distributed file storage system. In some embodiments, parameters are analyzed by machine learning so that scheduled antivirus scanning can be intelligently conducted. We teach creating a sequential order for scheduled antivirus scanning such that the files most likely to be accessed or needed by users in the future will be scanned for viruses before those files less likely to be accessed. Our teachings encompass the use of heuristic data compiled and analyzed on a per-file basis. We enable system administrators to determine which parameters to prioritize and to set thresholds for antivirus scanning such as time limits.

17 Claims, 5 Drawing Sheets

(51) Int. Cl.
*G06N 20/00* (2019.01)
*G06F 16/13* (2019.01)
*G06F 16/182* (2019.01)

(58) Field of Classification Search
CPC ....... G06F 16/13; G06F 16/182; G06N 5/003; G06N 20/00
USPC .............................. 726/22–25; 713/500–502
See application file for complete search history.

(56) References Cited

U.S. PATENT DOCUMENTS

| | | | | |
|---|---|---|---|---|
| 7,854,006 B1* | 12/2010 | Andruss | ................ | G06F 21/564 726/22 |
| 7,975,303 B1* | 7/2011 | Millard | ............... | G06F 11/3089 711/110 |
| 8,392,379 B2* | 3/2013 | Lee | ....................... | G06F 21/564 707/758 |
| 8,595,839 B2* | 11/2013 | Andrews | ............... | G06F 21/564 713/188 |
| 8,813,222 B1* | 8/2014 | Codreanu | ............. | G06F 21/56 726/22 |
| 10,108,902 B1* | 10/2018 | Lockett | ................ | G06N 3/0445 |
| 10,489,587 B1* | 11/2019 | Kennedy | ................ | G06N 5/003 |
| 2006/0288416 A1* | 12/2006 | Costea | .................... | G06F 21/51 726/24 |
| 2007/0079377 A1* | 4/2007 | Pagan | ................... | G06F 21/562 713/188 |
| 2009/0320134 A1* | 12/2009 | Corcoran | ............... | G06F 21/562 726/24 |
| 2012/0278266 A1* | 11/2012 | Naslund | ................. | G06N 20/00 706/45 |
| 2017/0091455 A1* | 3/2017 | Levchenko | ........... | G06F 21/577 |
| 2017/0337377 A1* | 11/2017 | Vlaznev | ............... | G06F 9/45558 |
| 2021/0073382 A1* | 3/2021 | Chen | ...................... | G06F 21/564 |

* cited by examiner

PREDICTIVE SCHEDULED ANTI-VIRUS SCANNING

CROSS REFERENCE TO RELATED APPLICATIONS

This application is related to co-pending U.S. patent application Ser. No. 16/043,333 for PREDICTIVE REAL-TIME AND SCHEDULED ANTI-VIRUS SCANNING and filed concurrently herewith, which is incorporated herein by reference for all purposes. This application is also related; to co-pending U.S. patent application Ser. No. 16/043,276 for PREDICTIVE REAL-TIME ANTI-VIRUS SCANNING and filed concurrently herewith, which is incorporated herein by reference for all purposes.

FIELD OF THE INVENTION

This invention relates generally to distributed file systems, and more particularly to implementations for using predictive anti-virus scanning to improve system performance for nodes among a cluster of nodes operating as a distributed file system.

BACKGROUND OF THE INVENTION

Distributed file systems offer many compelling advantages in establishing high performance computing environments. One example is the ability to easily expand, even at large scale. Another example is the ability to support multiple unique network protocols. In one example, a distributed file system can operate under a cluster of nodes topology, whereby clients can connect to any node among the cluster of nodes to perform file system activity. Individual nodes among the cluster of nodes each can contain their own processor(s), storage drives, memory and the like. Operating together in a cluster, the nodes can respond to client requests, store data, mirror data, and accomplish all the tasks of a modern file system. A cluster of nodes, in some cases, can provide easy scalability by providing for new nodes to be added to the cluster of nodes to increase the amount of storage space within the distributed file system and/or to meet other needs of the users of the distributed file system.

In terms of protecting data stored within a distributed file system from unwanted outside attacks, such as viruses, Trojan horses, worms, and the like, most file storage systems employ anti-virus ("AV") features. Anti-virus software is most frequently used at one of two points in time—either before reading a file or after closing a file. In the situation where a client's requests read access to a file, a storage node determines whether that file has been scanned for viruses before allowing access to the file. Storage nodes typically track when a file was last scanned for viruses or whether the virus definitions have been updated since the file of interest was last scanned. If it has been scanned, and it has not changed since it was last scanned, access is immediately granted. If however, the file has changed since it was last scanned, the file is sent for anti-viruses scanning, which is typically performed by anti-virus software stored on a server communicatively coupled to the distributed file system. After the file has been completely scanned, the client will be allowed access to the file. The time that it takes for the AV software to scan the file before allowing the client to access the file creates unwanted latency in access to the file.

AV scanning can also be performed when a client closes a file. From the client's perspective, file access in this situation is not slowed down. AV scanning each file individually upon closure, however, does consume compute resources.

In terms of background AV scanning, systems administrators typically schedule AV scans for all files housed within the file storage system on a periodic basis. Sometimes a system administrator limits the timeframe within which, or the duration for which, an AV scan will be performed. These limitations are designed to try to minimize the impact upon users that will be felt when a significant percentage of the system's processing resources will be devoted to AV activities. Ideally, a systems administrator may schedule an anti-virus scan of all files within a data storage system to run during evening hours for a limited duration.

Finding the optimal window within which to schedule background anti-virus scanning can be challenging however for large file storage systems because performing a complete AV scan on large file storage systems takes a significant amount of time. What typically happens in this situation is, an administrator will limit the duration for the AV scan to a few hours during the evening or on a weekend.

Often, the AV scanning software will only be able to scan a portion of the data files stored in the storage system because of the extensive amount of time required to scan an entire distributed file storage system. Compounding the problem, most AV programs typically perform anti-virus scanning blindly, that is, without paying heed to file heuristics such as frequency of use by clients of the files being scanned. The files that are successfully scanned during a scheduled AV scan, therefore, may or may not be important files from a client's perspective.

The end result of this is background AV scanning is precious compute resources are being wasted because the files that clear AV scanning are not correlated to client's behavior patterns with regard to stored data files. Worse yet, for those important files that are accessed frequently, they will have to be scanned for viruses in real-time before access can be granted, thus injecting file access latency. There is therefore a need for a more intelligent and selective way to perform anti-virus scanning in distributed file systems.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

Implementations are provided herein for systems, methods, and a non-transitory computer product configured to use predictive analysis of quantifiable parameters associated with individual files stored on a distributed file storage system. In some embodiments, parameters are analyzed by machine learning so that scheduled antivirus scanning can be intelligently conducted. We teach creating a sequential order for scheduled antivirus scanning such that the files most likely to be accessed or needed by users in the future will be scanned for viruses before those files less likely to be accessed. Our teachings encompass the use of heuristic data compiled, in some embodiments via machine learning, and analyzed on a per-file basis. We enable system administrators to determine which parameters to prioritize and to set thresholds for antivirus scanning such as time limits.

In some embodiments, we teach a method comprising: evaluating at a node of a distributed file system a plurality of parameters, each parameter being associated with a respective plurality of files stored in the distributed file storage system; creating a sequentially ordered list of the plurality of stored files based on the plurality of parameters, wherein the plurality of stored files are ordered according to at least one parameter; and performing a scheduled anti-virus scan on the plurality of stored files according to the sequential order of the list.

In alternate embodiments, we disclose a comprising at least one storage device and at least one hardware processor configured to: evaluate at a node of a distributed file system a plurality of parameters, each parameter being associated with a respective plurality of files stored in the distributed file storage system; create a prioritized list of the plurality of stored files based on the plurality of parameters, wherein the plurality of stored files are ordered sequentially according to a size of at least one parameter; and perform a scheduled anti-virus scan on the plurality of stored files according to the sequential order of the prioritized list.

In yet additional embodiments, we provide a non-transitory computer readable medium with program instructions stored thereon to perform the following acts: evaluate at a node of a distributed file system a plurality of parameters, each parameter being associated with a respective plurality of files stored in the distributed file storage system; create a prioritized list of the plurality of stored files based on the plurality of parameters, wherein the plurality of stored files are ordered sequentially according to a size of at least one parameter; and perform a scheduled anti-virus scan on the plurality of stored files according to the sequential order of the prioritized list.

The following description and the drawings set forth certain illustrative aspects of the specification. These aspects are indicative, however, of but a few of the various ways in which the principles of the specification may be employed. Other advantages and novel features of the specification will become apparent from the detailed description of the specification when considered in conjunction with the drawings.

DETAILED DESCRIPTION

Figure 1:
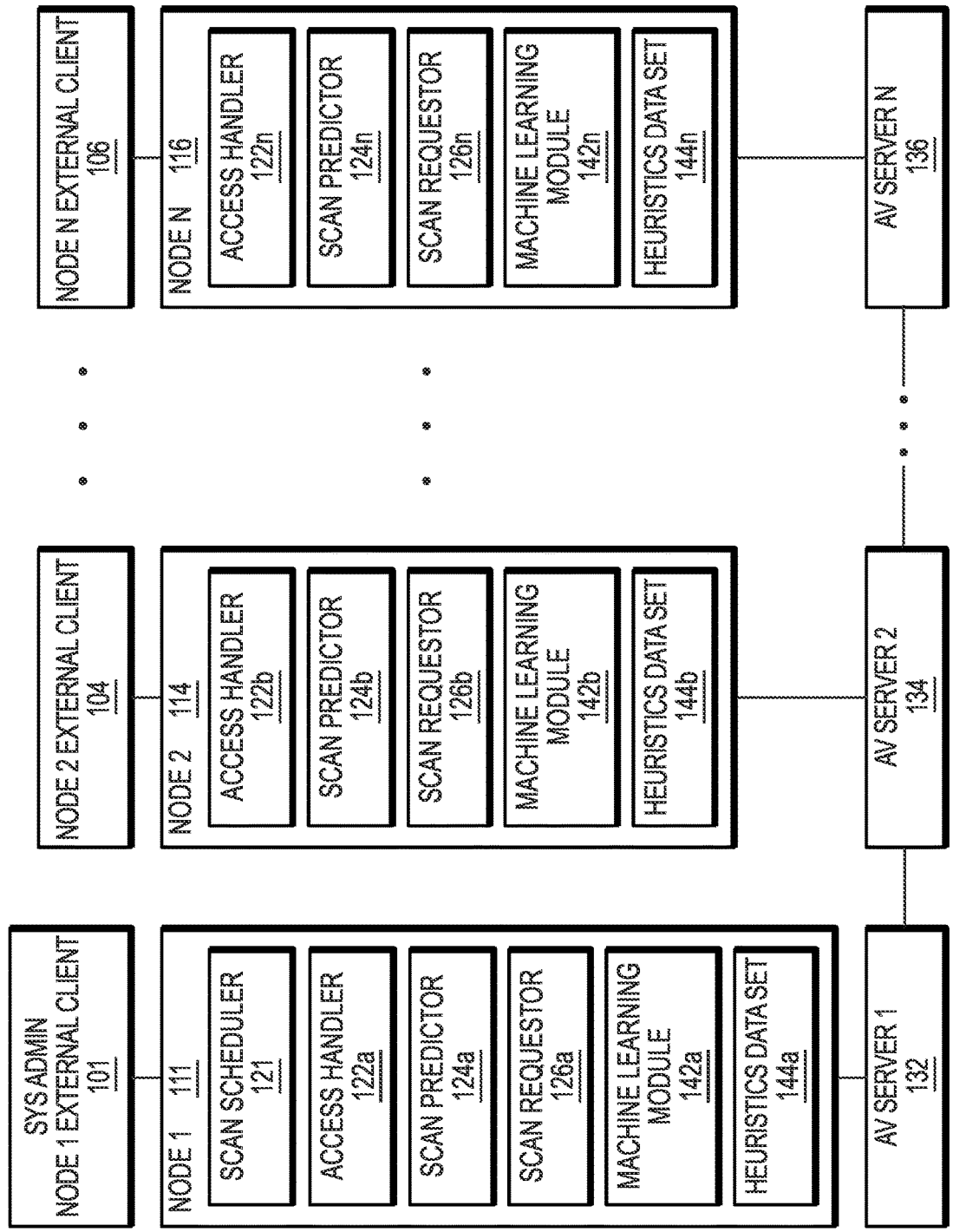
FIG. 1 illustrates an example cluster of nodes coupled to an anti-virus server configured in accordance with implementations of this disclosure.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

The term "inode," as used herein refers to data structures that may store information, or meta-data, about files and folders, such as size, file ownership, access mode (read, write, execute permissions), time and date of creation and modification, file type, or the like. In at least one of the various embodiments, inode data structures may contain one or more references or pointers to the actual data blocks of the contents stored in the file. In at least one of the various embodiments, inodes may be in a known location in a file system. From an inode, a reader or writer may access the contents of the inode and the contents of the file. Some file systems implement inodes using a data structure called an inode. In at least one of the various embodiments, a data structure explicitly named "inode" may be absent, but file systems may have data structures that store data similar to inodes and may provide capabilities similar to inodes as described herein. Also, in at least one of the various embodiments, the inode data may be referred to as stat data, in reference to the stat system call that provides the data to processes.

As used herein, the term "node" refers to a physical computing device, including, but not limited to, network devices, servers, processors, cloud architectures, or the like. A node may also include virtual machines, or the like. In at least one of the various embodiments, nodes may be arranged in a cluster interconnected by a high-bandwidth, low latency network backplane. In at least one of the various embodiments, non-resident clients may communicate to the nodes in a cluster through high-latency, relatively low-bandwidth front side network connections, such as Ethernet, or the like.

The term "cluster of nodes" refers to one or more nodes that operate together to form a distributed file system. In one example, a cluster of nodes forms a unified namespace for a distributed file system. Nodes within a cluster may communicate information about nodes within the cluster to other nodes in the cluster. Nodes among the cluster of nodes function using the same logical inode "LIN" mappings that describe the physical location of the data stored within the file system. Clients can connect to any one node among the cluster of nodes and access data stored within the cluster. For example, if a client is connected to a node, and that client requests data that is not stored locally within the node, the node can then load the requested data from other nodes of the cluster in order to fulfill the request of the client. Data protection plans can exist that stores copies or instances of file system data striped across multiple drives in a single node and/or multiple nodes among the cluster of nodes, thereby preventing failures of a node or a storage drive from disrupting access to data by the clients. Metadata, such as inodes, for an entire distributed file system can be mirrored and/or synched across all nodes of the cluster of nodes.

Implementations are provided herein for systems, methods, and computer products that perform predictive scheduled anti-virus scanning. In some embodiments, predictive algorithms are used to evaluate historical data related to interrelationships between files stored on a distributed file system. These interrelationships could be established using machine learning in some instances. Interrelationships could be determined by evaluating, for example, and without limitation, a sequence of repetitive file calls made by a user or an application.

As those of skill in the art know, running scheduled antivirus scanning as a background task, often performed during off-peak hours, requires a significant amount of compute resources. Systems administrators, therefore, try to schedule antivirus scans during off-peak usage timeslots. Even still, especially for distributed file systems, which have vast numbers of files stored thereon, scheduled antivirus scans often fail to complete. With no intelligence regarding prioritization of which files should be scanned during a scheduled antivirus scan, it is often the case that a partially completed antivirus scan is at best less than optimal and at worst a complete waste of compute resources.

It would, therefore, be beneficial to provide a mechanism that balances system resource usage against the likelihood that a particular file will be accessed by a client. In designing systems, methods, and computer program products that accomplish this general principle, there are many factors that can be taken into consideration when prioritizing files for scheduled antivirus scanning. By way of example, and without limitation, the following parameters associated with a file stored within the distributed file storage system could be considered when prioritizing files for scheduled antivirus scanning: an access frequency for the stored file, a date of a last access request for the stored file, a time of a last access request for the stored file, a file extension for the stored file, a true type for the stored file, a hash value for the stored file, a reputation for the stored file, a publisher for the stored file, a size for the stored file, an access zone for the stored file, a base directory for the stored file, a permission bit for the stored file, a creation time for the stored file, a last modification time for the stored file, or a last definition update time for the stored files.

In addition, it could be beneficial in embodiments to allow the system administrator to set threshold conditions for scheduled antivirus scanning. By way of example, some threshold conditions could be a total runtime amount, a total number of files to scan, a total percentage of files to scan, a total amount of resource consumption, real-time file access/usage exceeding a predetermined limit, and the like. These thresholds can vary depending on, for example and without limitation, the number of AV servers available for the distributed file system, facility resources, computer resources attendant to the AV servers, the number of cluster nodes, the type of cluster nodes (e.g., all flash nodes, accelerator nodes, and the like), and network bandwidth availability.

Referring now to FIG. 1, there is illustrated an example distributed file storage system having a cluster of nodes comprised of a first node 111, which can be a system administrator node, a second node 114, and an N-th node 116. Each node 111, 114, 116 contains modules configured to perform aspects of the functionality disclosed herein. In addition, each node 111, 114, 116 is accessed via an external client 101, 104, and 106, respectively. Client 101 is a system administrator node, which means it is the client 101 through which parameters may be chosen and thresholds may be set, as will be discussed in more detail below. Each node 111, 114, 116 is also coupled to an anti-virus servers 132, 134, and 136 respectively, which are in turn coupled to one another. Those of skill in the art will recognize that the connections between nodes 111, 114, 116 and clients 101, 104, 106 and AV servers 132, 134, 136 could be wired, wireless, or a combination of both.

Each node 111, 114 and 116 also has modules thereon configured to perform the functionality of disclosed embodiments. For example, we show an access handler 122*a*, 122*b*, and 122*n*, a scan predictor 124*a*, 124*b*, 124*n*, a scan requestor 126*a*, 126*b*, 126*n*, a machine learning module 142*a*, 142*b*, 142*n*, and a heuristics data set 144*a*, 144*b*, 144*n*. The systems administrator node 111 also includes a scan scheduler 121, which is used to schedule antivirus scans for the files stored in the distributed file storage system.

An exemplary distributed file system in accordance with embodiments herein is the Dell EMC Isilon Scale-Out Network Attached Storage (NAS). With respect to the Isilon Scale-Out NAS, users can enable anti-virus scanning by integrating third-party scanning services through for example an Internet Content Adaptation Protocol (ICAP). ICAP servers are configured to scan files for viruses. ICAP servers can scan files before they are opened, after they are closed or both. Sending files to be scanned after they are closed is faster, but less secure, while sending files to be scanned before they are opened is safer, but slower.

In an alternate embodiment, the teaching herein could be used with a Common AV Agent ("CAVA") based file sharing system. In a CAVA system, rather than send the file directly to the AV server for scanning, a share path for the file can be sent to the AV server instead. The AV server can then access the file over an export/share using a file sharing protocol. One such file sharing protocol is the SMB protocol. One advantage of using a CAVA type AV scan is increased speed of access to files for users, clients, or applications.

Embodiments herein could be run on Isilon Scale-Out NAS using an ICAP based-scan or a CAVA-based scan. In alternate embodiments, another Dell EMC product known as VNX could likewise practice the teachings of the inventive embodiments we disclose. In some embodiments, a VNX CEE could use a CAVA protocol for scanning. An exemplary workflow for a CAVA protocol AV scan on a VNX CEE could proceed as follows: (1) a user accesses a file over a storage cluster through a share/export; (2) if the file needs scanning, its path is sent to the VNX CEE server, which in some embodiments could be running remotely; (3) the VNX CEE server interacts with AV software to facilitate a file scan (in some embodiments, the CEE and AV software could be present on the same machine; (4) AV software accesses the file over the SMB from the cluster and scans it; (5) AV software takes necessary action (for example and without limitation, quarantine, delete, and the like) on the file if a virus is found; (6) VNX CEE server responds to cluster with file scan status over the CAVA protocol; and (7) the user, client or application is allowed the access to the file once it has been cleaned. In some embodiments, a system policy could be used to determine if the file is clean. For additional information regarding using the Common Event Enabler on Windows Platforms, see www.emc.com/collateral/TechnicalDocument/docu48055.pdf the entire contents of which are hereby incorporated by reference.

Those familiar with the Isilon Scale-Out NAS, and similar distributed file systems will recognize that you can also create anti-virus scanning policies, which send files to be scanned for viruses at a particular scheduled time. These type of scheduled anti-virus scans can be set to run on demand or at a predetermined, scheduled time. The number of ICAP servers required to support an Isilon cluster depends on how AV scanning is configured, the amount of data a cluster processes, and the processing power of the ICAP servers. ICAP servers can be configured to repair, quarantine or truncate any file having a virus detected therein.

ICAP servers can also be configured to apply global antivirus settings to all antivirus scans. They could alternatively be customized. ICAP servers use AV policies to determine how often to scan for viruses, when to scan, what to do with a file once a virus threat is detected and the like.

Additionally, policies or other files containing indicia of viruses are used to help ICAP servers determine when a virus is encountered.

While we have provided some information regarding an AV scanner used in connection with an Isilon Scale-Out NAS, these exemplary principles could apply to AV servers 132, 134, and 136.

Figure 2:
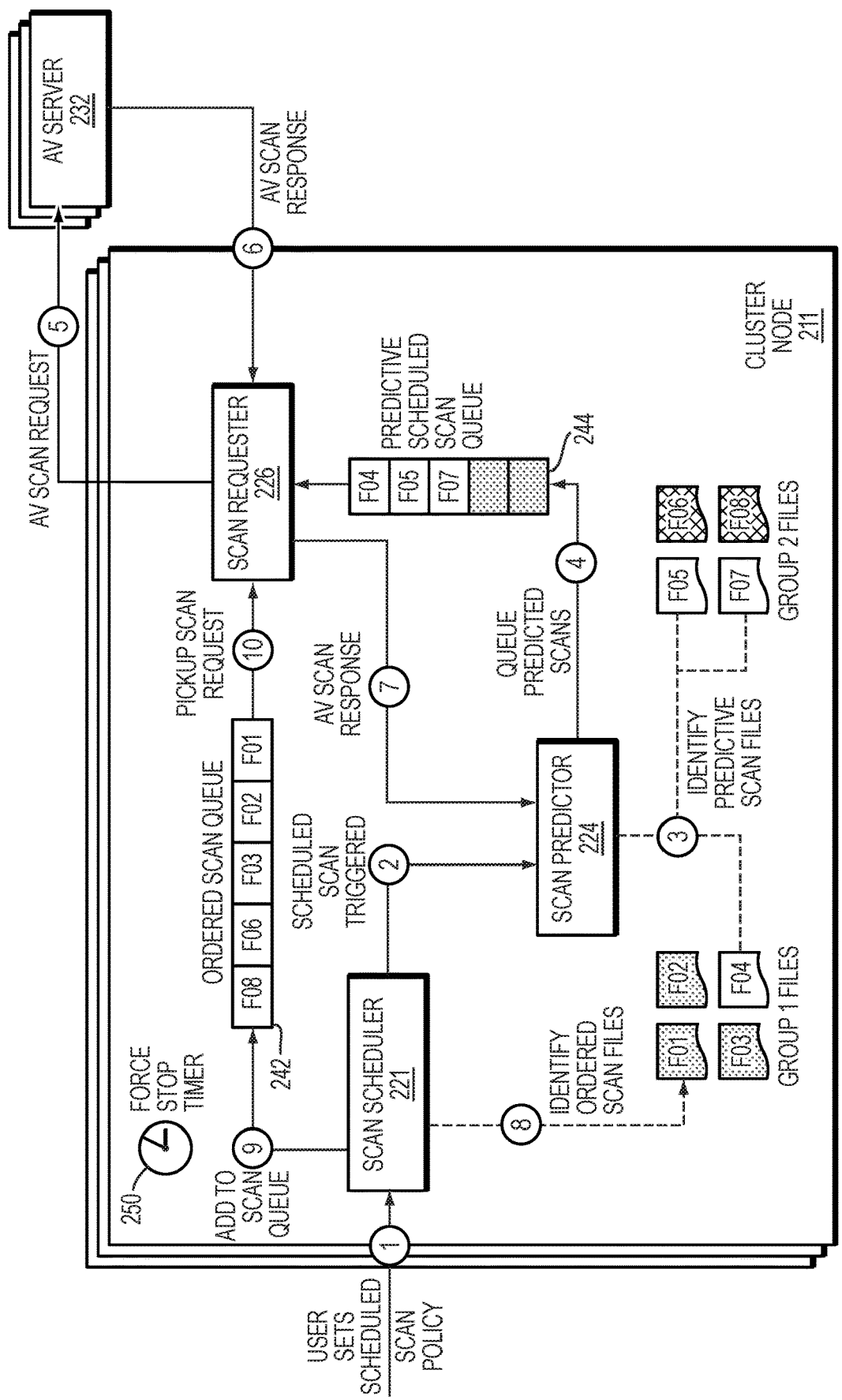
FIG. 2 illustrates a node coupled to an anti-virus server configured in accordance with implementations of this disclosure.
Figure 3:
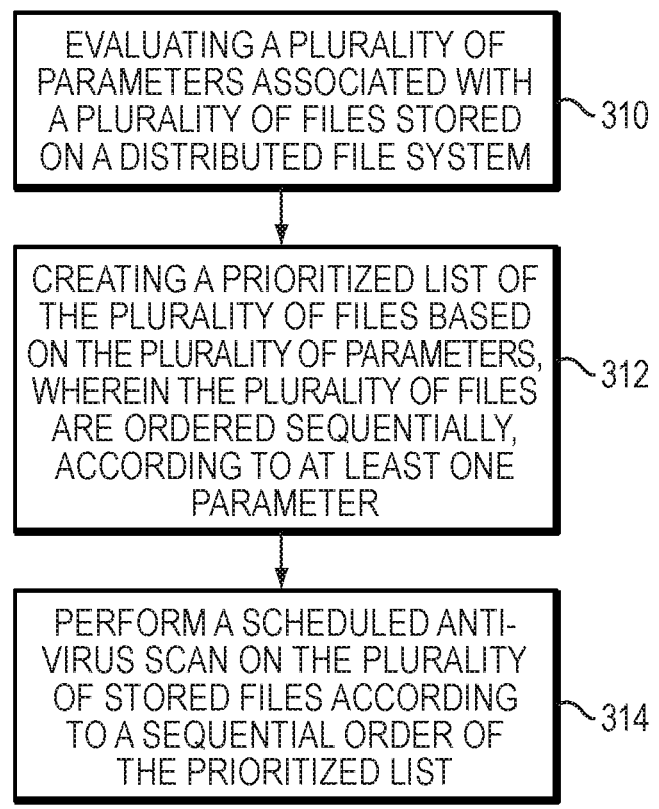
FIG. 3 illustrates an example method for performing predictive anti-virus scanning in accordance with implementations of this disclosure.

The functionality of predictive, scheduled AV scanning for embodiments herein will be further discussed with reference to FIG. 2 and FIG. 3. FIG. 2 shows a functional block diagram of a node 211, which could be a system administrator node, having a scan scheduler 221, a scan predictor 224, and a scan requester 226. In embodiments, a system administrator could schedule an antivirus scan via the scan scheduler 221. In typical scheduled antivirus scanning implementations, files are arbitrarily scheduled for scanning. The ordering criteria for the files could be alphabetical according to file name. It could be based on length of time since last file update. It could be based on file size, file type, and the like. With reference to FIG. 2, we show a combination of a scan predictor 224, which evaluates 310 a plurality of file parameters associated with each of the files stored on the distributed file storage system. The scan predictor 224 evaluates 310 myriad parameters associated with each file, and creates 312 a predictive scheduled scan queue 244 based on parameters chosen by the system administrator, or in some embodiments on default system settings. In most embodiments, parameters can be stored in a heuristics data set 144. A machine learning module 142 could be used to evaluate the heuristics data set 144 in order to create 312 a predictive scheduled scan queue 244.

As can be seen in FIG. 2, there are two separate queues for scanning, the ordered scan queue 242 and the predictive scheduled scan queue 244. In different embodiments, creating 312 a prioritized list of the plurality of files to be scanned could accord different weight to these two queues 242, 244. For example, in one embodiment, the files in the predictive scheduled scan queue 244 could be scanned first. In this embodiment, all of the files in the predictive scheduled scan queue 244 will be placed first when the prioritized list of files is created 312. After all files from the predictive scheduled scan queue have been added to the prioritized list 312, the files stored in the ordered scan queue 242 could be added 312 to the prioritized list.

In alternate embodiments, a system administrator could weight placement of files from the ordered scan queue 242 and the predictive scheduled scan queue 244. In this embodiment, files from the ordered scan queue 242 and the predictive scheduled scan queue 244 could be interspersed during creation 312 of the prioritized list of files to be scanned. The extent to which and the way in which files are interspersed could be controlled by a system administrator or a policy governing the distributed file system.

Once the prioritized list has been created 312, the scan requestor 226 can coordinate with the antivirus server 232 to perform 314 the scheduled antivirus scan in the sequential order established in the prioritized list. In some embodiments, a system administrator may establish a time limit, which could be managed by a force stop timer 250.

In terms of parameters that could be considered by the scan predictor 224 when creating a prioritized list of files to be scanned for viruses, without limitation, file parameters could include one or more of the following: an access frequency for one of the stored files, a date of a last access request for one of the stored files, a time of a last access request for one of the stored files, a file extension for one of the stored files, a true type for one of the stored files, a hash value for one of the stored files, a reputation for one of the stored files, a publisher for one of the stored files, a size for one of the stored files, an access zone for one of the stored files, a base directory for one of the stored files, a permission bit for one of the stored files, a creation time for one of the stored files, a last modification time for one of the stored files, or a last definition update time for one of the stored files.

Figure 4:
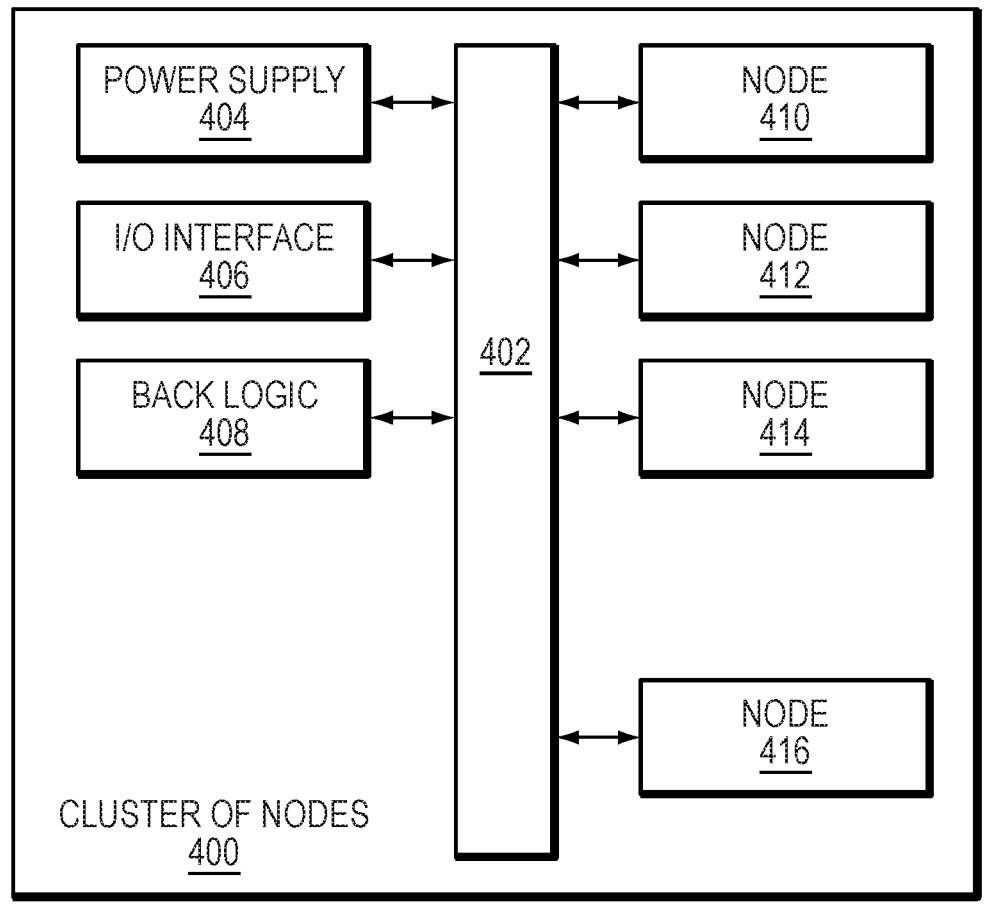
FIG. 4 illustrates an example block diagram of rack of a cluster of nodes in accordance with implementations of this disclosure.

FIG. 4 illustrates an example block diagram of a cluster of nodes in accordance with implementations of this disclosure. However, the components shown are sufficient to disclose an illustrative implementation. Generally, a node is a computing device with a modular design optimized to minimize the use of physical space and energy. A node can include processors, power blocks, cooling apparatus, network interfaces, input/output interfaces, etc. Although not shown, cluster of nodes typically includes several computers that merely require a network connection and a power cord connection to operate. Each node computer often includes redundant components for power and interfaces. The cluster of nodes 111, 114, 116 as depicted shows Nodes 410, 412, 414 and 416 operating in a cluster; however, it can be appreciated that more or less nodes can make up a cluster. It can be further appreciated that nodes among the cluster of nodes do not have to be in a same enclosure as shown for ease of explanation in FIG. 4, and can be geographically disparate. Backplane 402 can be any type of commercially available networking infrastructure that allows nodes among the cluster of nodes to communicate amongst each other in as close to real time as the networking infrastructure allows. It can be appreciated that the backplane 402 can also have a separate power supply, logic, I/O, etc. as necessary to support communication amongst nodes of the cluster of nodes.

As shown in the figure, enclosure 400 contains at least a power supply 404, an input/output interface 406, rack logic 408, several blade servers 410, 412, 414, and 416, and backplane 402. Power supply 404 provides power to each component and blade server within the enclosure. The input/output interface 406 provides internal and external communication for components and blade servers within the enclosure. Backplane 408 can enable passive and active communication of power, logic, input signals, and output signals for each blade server.

It can be appreciated that the Cluster of nodes 400 can be in communication with a second Cluster of Nodes as described in the subject disclosure and work in conjunction to provide at least the implementations as disclosed herein. Nodes can refer to a physical enclosure with a varying amount of CPU cores, random access memory, flash drive storage, magnetic drive storage, etc. For example, a single Node could contain, in one example, disk drive bays with attached disk storage in each bay. It can be appreciated that nodes within the cluster of nodes can have varying configurations and need not be uniform.

Figure 5:
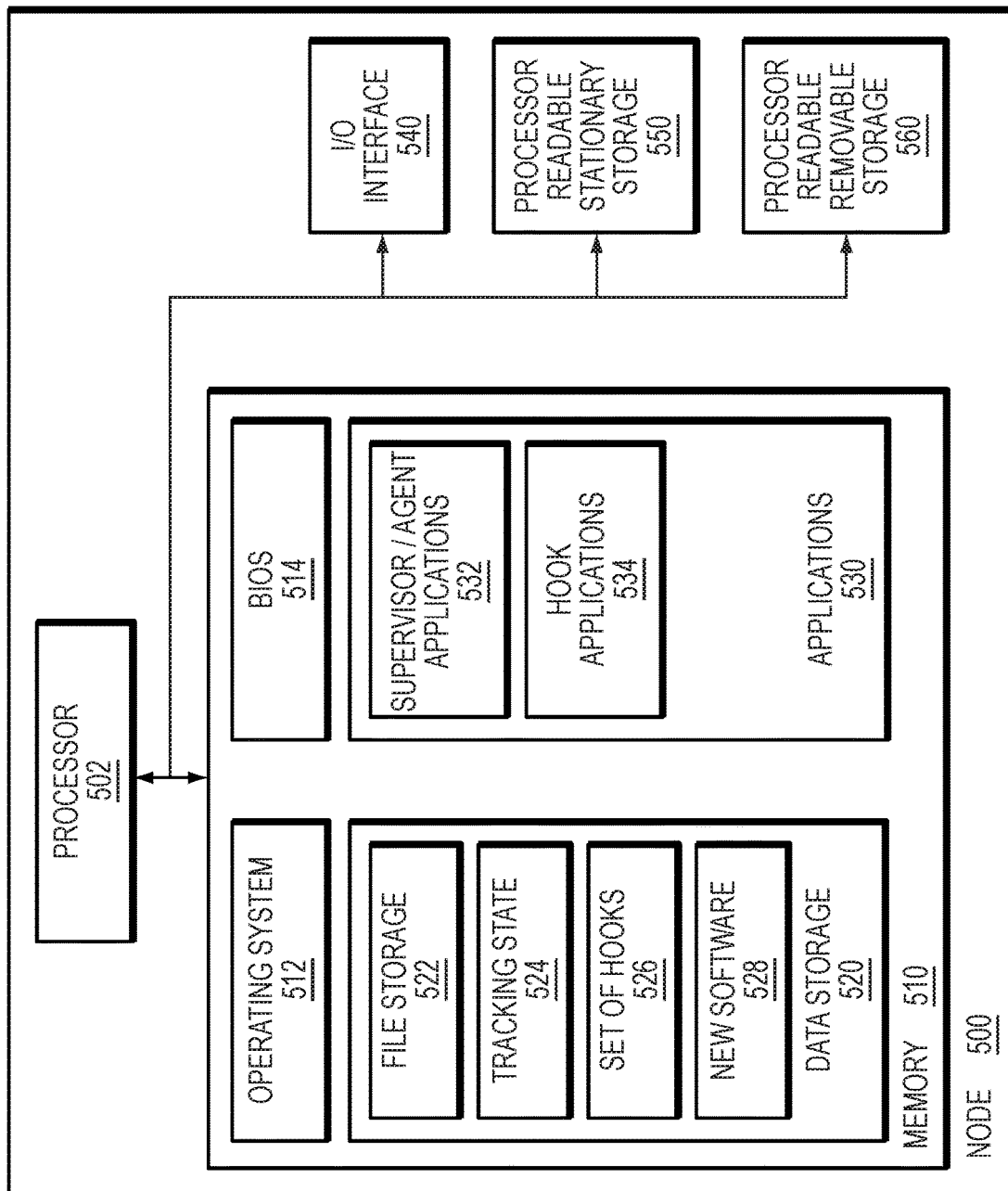
FIG. 5 illustrates an example block diagram of a node in accordance with implementations of this disclosure.

FIG. 5 illustrates an example block diagram of a blade server 500 in accordance with implementations of this disclosure. As shown in FIG. 5, a plurality of blade servers may be included in one enclosure that shares resources provided by the enclosure to reduce size, power, and cost.

Node 500 includes processor 502 which communicates with memory 510 via a bus. Node 500 also includes input/output interface 540, processor-readable stationary storage device(s) 550, and processor-readable removable storage device(s) 560. Input/output interface 540 can enable node 500 to communicate with other nodes, mobile devices, network devices, and the like. Processor-readable stationary storage device 550 may include one or more devices such as an electromagnetic storage device (hard disk), solid state hard disk (SSD), hybrid of both an SSD and a hard disk, and the like. In some configurations, a node may include many storage devices. Also, processor-readable removable storage device 560 enables processor 502 to read non-transitive storage media for storing and accessing processor-readable instructions, modules, data structures, and other forms of data. The non-transitive storage media may include Flash drives, tape media, floppy media, disc media, and the like.

Memory 510 may include Random Access Memory (RAM), Read-Only Memory (ROM), hybrid of RAM and ROM, and the like. As shown, memory 510 includes operating system 512 and basic input/output system (BIOS) 514 for enabling the operation of blade server 500. In various embodiments, a general-purpose operating system may be employed such as a version of UNIX, LINUX™, FreeBSD, OneFS, a specialized server operating system such as Microsoft's Windows Server™ and Apple Computer's OS X, or the like.

Applications 530 may include processor executable instructions which, when executed by node 500, transmit, receive, and/or otherwise process messages, audio, video, and enable communication with other networked computing devices. Examples of application programs include database servers, file servers, calendars, transcoders, and so forth. Applications 530 may include, for example, supervisor and agent applications 532 and event hook applications 534 according to implementations of this disclosure. It can be appreciated that a UI for such application can exists, such as within a web UI for the distributed file system as a whole.

Human interface components (not pictured), may be remotely associated with blade server 500, which can enable remote input to and/or output from blade server 500. For example, information to a display or from a keyboard can be routed through the input/output interface 540 to appropriate peripheral human interface components that are remotely located. Examples of peripheral human interface components include, but are not limited to, an audio interface, a display, keypad, pointing device, touch interface, and the like.

Data storage 520 may reside within memory 510 as well, storing file storage 522 data such as metadata or LIN data. It can be appreciated that LIN data and/or metadata can relate to file storage within processor readable stationary storage 550 and/or processor readable removable storage 560. For example, LIN data may be cached in cache memory 524 for faster or more efficient frequent access versus being stored within processor readable stationary storage 550. In addition, Data storage 520 can also store the tracking state 524 of a node for reference by the supervisor and/or agent applications. Sets of hooks 526 can be stored within data storage. New software 528 such as the image for the new version of the distributed file system as well as old version of the distributed file system that supports a node being rolled back.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present disclosure. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A method comprising:
    evaluating at a node of a distributed file system a plurality of parameters, each parameter being associated with a respective plurality of files stored in the distributed file system, the distributed file system further comprising an ordered scan queue and a predictive scan queue, the predictive scan queue containing one or more files having a statistically significant likelihood of being accessed based on an association between the one or more files and a previous access request, the predictive scan queue being created using a machine learning module trained to analyze the plurality of parameters and the association between the one or more files and the previous access request;
    creating a prioritized list of the plurality of stored files based on the plurality of parameters, wherein the plurality of stored files are ordered sequentially according to a size of at least one parameter;
    storing the prioritized list of the plurality of stored files in the ordered scan queue, the ordered scan queue comprising the plurality of stored files to undergo a scheduled anti-virus scan on a lower priority than the one or more files in the predictive scan queue; and
    performing the scheduled anti-virus scan on the one or more files in the predictive scan queue, followed by the scheduled anti-virus scan on the plurality of stored files in the ordered scan queue according to the sequential order of the prioritized list.

2. The method according to claim 1, wherein the plurality of parameters are stored in a heuristics data set.

3. The method of claim 1, wherein the machine learning module analyzes the plurality of parameters in order to create the predictive scan queue and create an order of the prioritized list.

4. The method according to claim 1, wherein the parameter is one or more of: an access frequency for one of the stored files, a date of a last access request for one of the stored files, a time of a last access request for one of the stored files, a file extension for one of the stored files, a true type for one of the stored files, a hash value for one of the stored files, a reputation for one of the stored files, a publisher for one of the stored files, a size for one of the stored files, an access zone for one of the stored files, a base directory for one of the stored files, a permission bit for one of the stored files, a creation time for one of the stored files, a last modification time for one of the stored files, or a last definition update time for one of the stored files.

5. The method according to claim 1, further comprising stopping the scheduled anti-virus scan once a threshold condition has been met.

6. The method according to claim 5, wherein the threshold is one or more of the following: a total runtime amount, a total number of files to scan, a total percentage of files to scan, a total amount of resource consumption, a maximum real-time file access value, or a maximum real-time file usage value.

7. A system comprising at least one storage device and at least one hardware processor configured to:
    evaluate at a node of a distributed file system a plurality of parameters, each parameter being associated with a respective plurality of files stored in the distributed file system, the distributed file system further comprising an ordered scan queue and a predictive scan queue, the predictive scan queue containing one or more files having a statistically significant likelihood of being accessed based on an association between the one or more files and a previous access request, and the predictive scan queue being created using a machine learning module trained to analyze the plurality of parameters and the association between the one or more files and the previous access request;
    create a prioritized list of the plurality of stored files based on the plurality of parameters, wherein the plurality of stored files are ordered sequentially according to a size of at least one parameter;
    store the prioritized list of the plurality of stored files in the ordered scan queue, the ordered scan queue comprising the plurality of stored files to undergo a scheduled anti-virus scan on a lower priority than the one or more files in the predictive scan queue; and
    perform the scheduled anti-virus scan on the one or more files in the predictive scan queue, followed by the scheduled anti-virus scan on the plurality of stored files in the ordered scan queue according to the sequential order of the prioritized list.

8. The system of claim 7, wherein the plurality of parameters are stored in a heuristics data set.

9. The system of claim 7, wherein the machine learning module analyzes the plurality of parameters in order to create an order of the prioritized list.

10. The system of claim 7, wherein the parameter is one or more of: an access frequency for one of the stored files, a date of a last access request for one of the stored files, a time of a last access request for one of the stored files, a file extension for one of the stored files, a true type for one of the stored files, a hash value for one of the stored files, a reputation for one of the stored files, a publisher for one of the stored files, a size for one of the stored files, an access zone for one of the stored files, a base directory for one of the stored files, a permission bit for one of the stored files, a creation time for one of the stored files, a last modification time for one of the stored files, or a last definition update time for one of the stored files.

11. The system of claim 7, further configured to stop the scheduled anti-virus scan once a threshold condition has been met.

12. A non-transitory computer readable medium with program instructions stored thereon the program instructions when executed by a processor cause the processor to perform the following acts:
    evaluate at a node of a distributed file system a plurality of parameters, each parameter being associated with a respective plurality of files stored in the distributed file system, the distributed file system further comprising an ordered scan queue and a predictive scan queue, the predictive scan queue containing one or more files having a statistically significant likelihood of being accessed based on an association between the one or more files and a previous access request, the predictive scan queue being created using a machine learning module trained to analyze the plurality of parameters and the association between the one or more files and the previous access request;
    create a prioritized list of the plurality of stored files based on the plurality of parameters, wherein the plurality of stored files are ordered sequentially according to a size of at least one parameter;
    store the prioritized list of the plurality of stored files in the ordered scan queue, the ordered scan queue comprising the plurality of stored files to undergo a scheduled anti-virus scan on a lower priority than the one or more files in the predictive scan queue; and
    perform the scheduled anti-virus scan on the one or more files in the predictive scan queue, followed by the scheduled anti-virus scan on the plurality of stored files in the ordered scan queue according to the sequential order of the prioritized list.

13. The non-transitory computer readable medium of claim 12, wherein the plurality of parameters are stored in a heuristics data set.

14. The non-transitory computer readable medium of claim 12, wherein the machine learning module analyzes the plurality of parameters in order to create the predictive scan queue and create an order of the prioritized list.

15. The non-transitory computer readable medium of claim 12, wherein the parameter is one or more of: an access frequency for one of the stored files, a date of a last access request for one of the stored files, a time of a last access request for one of the stored files, a file extension for one of the stored files, a true type for one of the stored files, a hash value for one of the stored files, a reputation for one of the stored files, a publisher for one of the stored files, a size for one of the stored files, an access zone for one of the stored files, a base directory for one of the stored files, a permission bit for one of the stored files, a creation time for one of the stored files, a last modification time for one of the stored files, or a last definition update time for one of the stored files.

16. The non-transitory computer readable medium of claim 12 with program instructions stored thereon to further perform the following acts: stop the scheduled anti-virus scan once a threshold condition has been met.

17. The non-transitory computer readable medium of claim 16, wherein the threshold is one or more of the following: a total runtime amount, a total number of files to scan, a total percentage of files to scan, a total amount of resource consumption, a maximum real-time file access value, or a maximum real-time file usage value.

* * * * *